United States Patent
Bennett et al.

(10) Patent No.: US 11,473,703 B2
(45) Date of Patent: *Oct. 18, 2022

(54) FERRULE ASSEMBLY FOR CONDUIT FITTING

(71) Applicant: Swagelok Company, Solon, OH (US)

(72) Inventors: Mark A. Bennett, Bainbridge Township, OH (US); Cal R. Brown, Lyndhurst, OH (US); John D. Karkosiak, Broadview Heights, OH (US); Peter C. Williams, Cleveland Heights, OH (US); Mark A. Clason, Orwell, OH (US); Jeffrey S. Rayle, Rocky River, OH (US); Mark D. Bearer, Akron, OH (US)

(73) Assignee: Swagelok Company, Solon, OH (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/808,992

(22) Filed: Mar. 4, 2020

(65) Prior Publication Data

US 2020/0200306 A1    Jun. 25, 2020

Related U.S. Application Data

(63) Continuation of application No. 15/003,237, filed on Jan. 21, 2016, now Pat. No. 10,619,770, which is a (Continued)

(51) Int. Cl.
*F16L 19/10* (2006.01)
*F16L 19/06* (2006.01)

(52) U.S. Cl.
CPC ............ *F16L 19/103* (2013.01); *F16L 19/061* (2013.01)

(58) Field of Classification Search
CPC ........ F16L 19/103; F16L 19/061; F16L 19/04
See application file for complete search history.

(56) References Cited

U.S. PATENT DOCUMENTS

| 1,672,879 A | 6/1928 | Campbell, Jr. |
| 1,809,064 A | 6/1931 | Pearson |
| (Continued) | | |

FOREIGN PATENT DOCUMENTS

| CN | 1113665 | 12/1995 |
| CN | 1969142 | 5/2007 |
| (Continued) | | |

OTHER PUBLICATIONS

International Search Report and Written Opinion from PCT/US11/21677 dated Mar. 18, 2011

(Continued)

*Primary Examiner* — Matthew Troutman
*Assistant Examiner* — Fannie C Kee
(74) *Attorney, Agent, or Firm* — Calfee, Halter & Griswold LLP

(57) ABSTRACT

Two conduit gripping devices that are to be used together in a conduit fitting assembly are interconnected or held together as a cartridge or subassembly prior to assembly with fitting components to form a fitting assembly. In a more specific embodiment, one or both of the conduit gripping devices comprises a retaining structure by which the devices are mechanically connected together as a subassembly. For example, in one embodiment a front ferrule and a back ferrule for a tube fitting may be snapped together.

22 Claims, 10 Drawing Sheets

Related U.S. Application Data continuation of application No. 12/635,301, filed on Dec. 10, 2009, now Pat. No. 9,267,627.

(60) Provisional application No. 61/121,298, filed on Dec. 10, 2008.

(56) References Cited

U.S. PATENT DOCUMENTS

| | | |
|---|---|---|
| 2,389,233 A | 11/1945 | Cowles |
| 2,497,273 A | 2/1950 | Richardson |
| 2,547,889 A | 4/1951 | Richardson |
| 3,004,776 A | 10/1961 | Sebardt |
| 3,074,747 A | 1/1963 | Boughton |
| 3,083,989 A | 4/1963 | Press |
| 3,103,373 A | 9/1963 | Lennon |
| 3,215,457 A | 11/1965 | Teeters |
| 3,218,096 A | 11/1965 | Press |
| 3,219,367 A | 11/1965 | Franck |
| 3,250,550 A | 5/1966 | Lyon |
| 3,306,637 A | 2/1967 | Press et al. |
| 3,321,947 A | 5/1967 | Teeters |
| 3,325,192 A | 6/1967 | Sullivan |
| 3,433,508 A | 3/1969 | Teeters |
| 3,498,647 A | 3/1970 | Schroder |
| 3,582,115 A | 6/1971 | Clague |
| 3,695,640 A | 10/1972 | Clague |
| 3,707,302 A | 12/1972 | Hiszpanski |
| 3,893,716 A | 7/1975 | Moreiras |
| 3,972,547 A | 8/1976 | Itoya |
| 4,022,497 A | 5/1977 | Kotsakis |
| 4,076,286 A | 2/1978 | Spontelli |
| 4,136,597 A | 1/1979 | Haluch |
| 4,136,897 A | 1/1979 | Haluch |
| 4,309,050 A | 1/1982 | Legris |
| 4,328,980 A | 5/1982 | Normark |
| 4,500,117 A | 2/1985 | Ayers |
| 4,575,274 A | 3/1986 | Hayward |
| 4,592,574 A | 6/1986 | Vollmuth et al. |
| 4,805,932 A | 2/1989 | Imhof et al. |
| 4,826,218 A * | 5/1989 | Zahuranec ............ F16L 19/103 285/342 |
| 5,351,998 A | 10/1994 | Behrens et al. |
| 5,388,866 A | 2/1995 | Schlosser |
| 5,586,910 A | 12/1996 | Del Negro et al. |
| 5,882,050 A | 3/1999 | Williams et al. |
| 5,961,160 A | 10/1999 | Frohlich |
| 6,073,976 A * | 6/2000 | Schmidt ................ F16L 19/12 285/341 |
| 6,079,749 A | 6/2000 | Albino et al. |
| 6,629,708 B2 | 10/2003 | Williams et al. |
| 6,905,142 B2 | 6/2005 | Do |
| 7,108,288 B2 | 9/2006 | Bennett et al. |
| 7,316,777 B2 | 1/2008 | Loy, Jr. |
| 7,469,936 B2 | 12/2008 | Norman |
| 7,497,483 B2 | 3/2009 | Williams et al. |
| 7,690,693 B2 | 4/2010 | Moner |
| 7,695,027 B2 | 4/2010 | Williams et al. |
| 8,007,013 B2 | 8/2011 | Arstein |
| 8,641,099 B2 | 2/2014 | Cuva |
| 8,931,810 B2 * | 1/2015 | Clason ................ F16L 19/103 285/342 |
| 10,619,770 B2 | 4/2020 | Bennett |
| 2002/0148128 A1 | 10/2002 | Williams |
| 2005/0097763 A1 | 5/2005 | Williams |
| 2006/0006651 A1 | 1/2006 | Watanabe |
| 2006/0138772 A1 | 6/2006 | Galante et al. |
| 2006/0237962 A1 | 10/2006 | Anderson et al. |
| 2009/0045624 A1 | 2/2009 | Nakata et al. |
| 2010/0148501 A1 | 6/2010 | Bennett et al. |
| 2011/0181042 A1 | 7/2011 | Clason et al. |
| 2013/0106103 A1 | 5/2013 | Horsfall et al. |
| 2014/0232111 A1 | 8/2014 | Shimamura |
| 2014/0353969 A1 | 12/2014 | Shimamura |
| 2015/0167873 A1 | 6/2015 | Arstein |
| 2016/0281892 A1 | 9/2016 | Arstein |
| 2017/0059065 A1 * | 3/2017 | Williams ................ F16L 19/06 |

FOREIGN PATENT DOCUMENTS

| | | |
|---|---|---|
| CN | 201053546 | 4/2008 |
| CN | 101305232 | 11/2008 |
| CN | 101617159 | 12/2009 |
| CN | 101802474 | 8/2010 |
| DE | 841091 | 6/1952 |
| DE | 4219722 | 12/1993 |
| DE | 19607784 | 8/2006 |
| GB | 2032555 | 5/1980 |
| JP | S57187985 | 11/1982 |
| JP | 11-030368 | 2/1999 |
| JP | H11-030368 | 2/1999 |
| JP | 2003-232474 | 8/2003 |
| JP | 2005-337326 | 12/2005 |
| JP | 2007-146893 | 6/2007 |
| JP | 2009085430 | 4/2009 |
| JP | 2009-097715 | 5/2009 |
| WO | 2005/106310 | 11/2005 |
| WO | 2006/084766 | 8/2006 |
| WO | 09/003015 | 12/2008 |
| WO | 2009/018079 | 2/2009 |
| WO | 2009/034948 | 3/2009 |
| WO | 10/129261 | 11/2010 |

OTHER PUBLICATIONS

International Search Report and Written Opinion from PCT/US09/67508 dated Mar. 8, 2010.
Office action from Chinese Application No. 200980156418.9 dated Feb. 5, 2013.
English version of currently pension claims from Chinese Application No. 200980156418.9 as of Apr. 2, 2013.
Office action from European Application No. 09793392.3 dated Nov. 18, 2013.
Office action from U.S. Appl. No. 13/009,325 dated Aug. 21, 2013.
Office action from Korean Application No. 10-2011-7015902 dated Aug. 11, 2015.
Office action from Japanese Application No. 2011-540891 dated Jun. 26, 2015.
Office action from Israeli Patent Application dated 220969 dated Jan. 25, 2015 along with English translation of relevant portions of action.
Office action from Chinese Application No. 200980156418.9 dated Jul. 28, 2014.
Office action from Chinese Application No. 20118015523.8 dated Feb. 8, 2014.
Office action from Chinese Application No. 200980156418.9 dated Jan. 22, 2015.
Office action from Chinese Application No. 200980156418.9 dated Dec. 11, 2013.
Office action from Canadian Application No. 2750889 dated Feb. 1, 2016.
Office action from Japanese Application No. 2011-540891 dated Jan. 4, 2016.

* cited by examiner

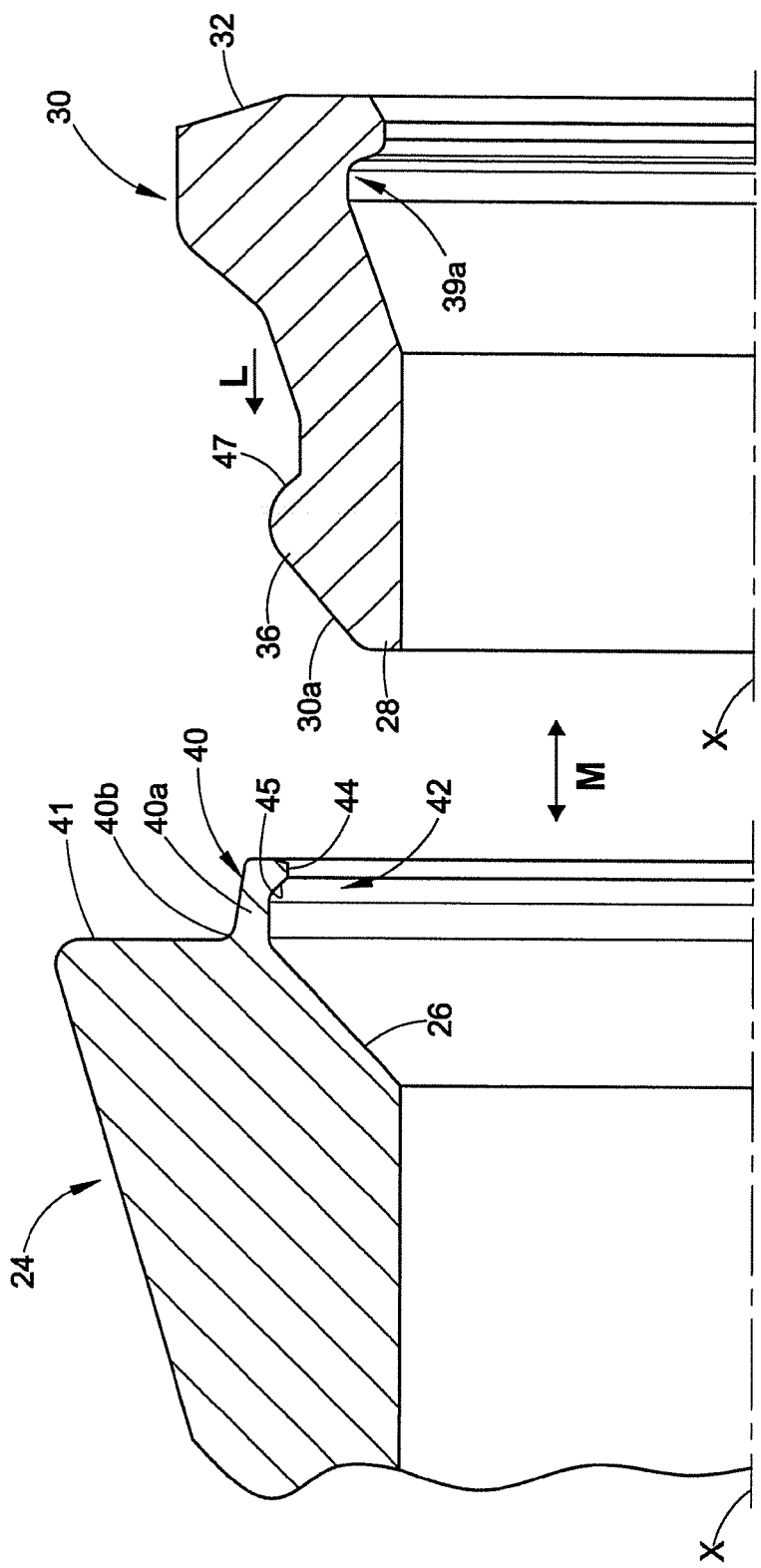

FERRULE ASSEMBLY FOR CONDUIT FITTING

RELATED APPLICATIONS

This application is a continuation of U.S. patent application Ser. No. 15/003,237, filed on Jan. 21, 2016, titled "Ferrule Assembly for Conduit Fitting" which claims the benefit of U.S. patent application Ser. No. 12/635,301, filed Dec. 10, 2009, titled "Ferrule Assembly for Conduit Fitting", now U.S. Pat. No. 9,267,627, which claims priority to U.S. Provisional Application Ser. No. 61/121,298, filed Dec. 20, 2008, the entire disclosures of which are incorporated by reference.

TECHNICAL FIELD OF THE INVENTIONS

The present disclosure relates to fittings for making mechanically attached connections between a conduit and another fluid component, for containing liquid or gas fluids. More particularly, the disclosure relates to fittings for tube and pipe conduits that use two or more conduit gripping devices, for example, ferrules.

BACKGROUND

Fittings for making mechanical connections between a conduit and another fluid component often include two ferrules and two fitting components. It is known from U.S. Pat. No. 3,250,550 to provide a press fit connection between a sleeve member and a compression ring pushed together to a positive stop in a self-flaring tube coupling. It is also known from U.S. Pat. No. 5,351,998 to apply an adhesive to a sliding conical surface between a holding element and a sealing element for a coupling device.

SUMMARY OF THE DISCLOSURE

In accordance with an embodiment of one of the inventions presented in this disclosure, two conduit gripping devices that are to be used together in a fitting assembly are interconnected or held together as a single unit, cartridge or subassembly prior to being assembled into a fitting assembly. In a more specific embodiment, one or both of the conduit gripping devices comprises structure by which the devices are mechanically connected together as a discrete subassembly. For example, in one embodiment a front ferrule and a back ferrule for a tube fitting may be snapped together.

BRIEF DESCRIPTION OF THE DRAWINGS

FIGS. 2A and 2B illustrate a more detailed illustration of a front and back ferrule retaining structure for a fitting in accordance with one or more of the inventions herein, shown partially in longitudinal half cross-section;

DESCRIPTION OF THE EXEMPLARY EMBODIMENTS

Figure 1A:
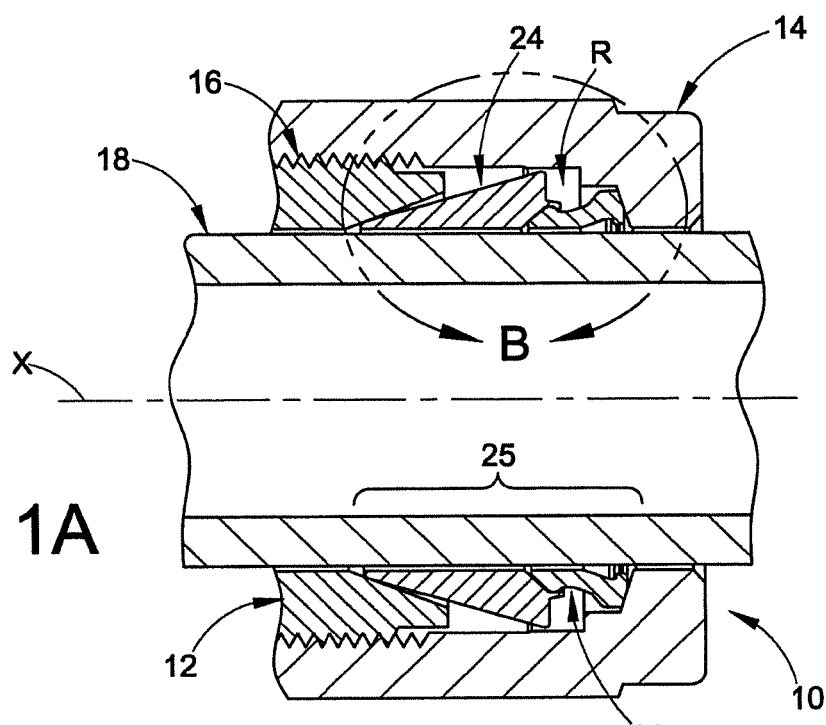
FIGS. 1A and 1B illustrate an embodiment of a conduit fitting assembly of one or more of the inventions herein, shown in longitudinal cross-section and in a finger tight position.

Although the exemplary embodiments herein are presented in the context of a stainless steel tube fitting, the inventions herein are not limited to such applications, and will find use with many different metal conduits such as tube and pipe as well as different materials other than 316 stainless steel, including different metals for either the conduit, the gripping devices or the fitting components or any combination thereof. The inventions may also be used for liquid or gas fluid systems. While the inventions herein are illustrated with respect to particular designs of the conduit gripping devices and fitting components, the inventions are not limited to use with such designs, and will find application in many different fitting designs known today or later developed that use at least two conduit gripping devices. We use the term "conduit gripping device" to refer to a generally annular member that is closely received about an outer surface of a conduit and that upon fitting make-up is radially compressed against that surface. The term "gripping" does not necessarily require that the conduit gripping device be permanently attached to the conduit as a result of a partial or complete pull-up of the fitting assembly, or that the conduit gripping device cut into the surface of the conduit. We use the term "ferrule set" to refer to a combination of at least two conduit gripping devices with or without other parts that form the means by which conduit grip and seal are achieved. Although not necessary with all fitting designs, it is common that a ferrule set comprises two ferrules that are purposely matched to each other and to the fitting components, for example, based on material, manufacturer, interrelated design and geometry features and so on. In some fittings, in addition to the conduit gripping devices there may be one or more additional parts, for example seals. Therefore, the term "ferrule set" may also include in some embodiments one or more conduit gripping devices with one or more other parts by which the ferrule set effects conduit grip and seal after a complete pull-up. The inventions may be used with tube or pipe, so we use the term "conduit" to include tube or pipe or both. We generally use the terms "fitting assembly" or "fitting" interchangeably as a shorthand reference to an assembly of typically first and second fitting components along with two or more conduit gripping devices. The concept of a "fitting assembly" thus may include assembly of the parts onto a conduit, either in a finger-tight, partial or complete pull-up position; but the term "fitting assembly" is also intended to include an assembly of parts together without a conduit, for example for shipping or handling, as well as the constituent parts themselves even if not assembled together. Fittings typically include two fitting components that are joined together, and one or more conduit gripping devices, however, the inventions herein may be used with fittings that include additional pieces and parts. For example, a union fitting may include a body, four ferrules and two nuts. We use the term "fitting remake" and derivative phrases herein to refer to a fitting assembly that has been at least once tightened or completely pulled-up, then loosened, and then re-tightened to another completely pulled-up position. Remakes may be done with the same fitting assembly parts (e.g. nut, body, ferrules), for example, or may involve the replacement of one of more of the parts of the fitting assembly. Reference herein to "outboard" and "inboard" are for convenience and simply refer to whether an axial direction is towards the center of a fitting (inboard) or away from the center (outboard).

A significant feature of the inventions herein is the provision of a retaining structure (R) by which two or more conduit gripping devices (for example, a ferrule set) are retained or held together as a discrete unit, subassembly or cartridge 25, prior to assembling the unit with fitting components to form a complete fitting. By "cartridge" we mean a group of parts retained together as a discontinuous unit, subassembly or preassembly. We therefore use the terms cartridge, unit, subassembly and preassembly synonymously herein in the context of a discontinuous structure. We also use the term "ferrule cartridge" or "conduit gripping device cartridge" interchangeably to refer to a unit or subassembly made up of at least two ferrules or conduit gripping devices held together as a discrete or standalone unit. In particular, a "ferrule cartridge" includes two or more ferrules held together as a discrete unit or subassembly, and may include additional parts, for example, seals. Thus, a ferrule cartridge may provide a complete ferrule set for a fitting.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1B:
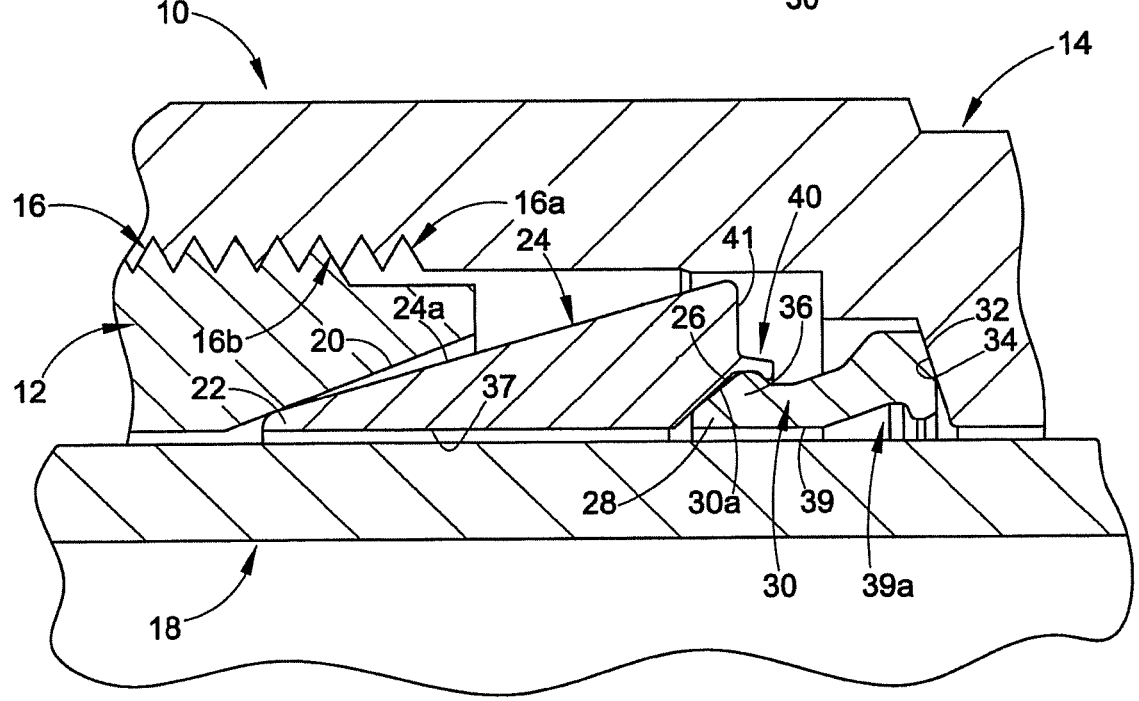

With reference to FIGS. 1A and 1B, a first embodiment of one or more of the inventions is presented. Note that in FIGS. 1A and 1B the fitting is illustrated in longitudinal cross-section relative to the longitudinal centerline X. All references herein to "radial" and "axial" are referenced to the X axis except as may otherwise be noted. Also, all references herein to angles are referenced to the X axis except as may otherwise be noted. Furthermore, various gaps and spacing between parts in the drawings may be exaggerated somewhat for clarity or due to scale.

In this example, a tube or pipe fitting 10 may include a first fitting component 12 and a second fitting component 14. These parts are commonly known in the art as a body and nut respectively, wherein the body 12 receives a conduit 18 end, and the nut 14 may be joined to the body 12 during make up or assembly of the fitting 10. Although we use the common terms of body and nut herein as a convenience, those skilled in the art will appreciate that the inventions are not limited to applications wherein such terminology may be used to describe the parts. The body 12 may be a stand-alone component as illustrated or may be integral with or integrated or assembled into another component or assembly such as, for example, a valve, a tank or other flow device or fluid containment device. The body 12 may have many different configurations, for example, a union, a tee, an elbow and so on to name a few that are well known in the art. Although the body 12 and nut 14 are illustrated as being threadably joined together by a threaded connection 16, threaded connections are not required in all uses. For example, some fittings have parts that are clamped together. Fittings are also commonly referred to in the art as male fittings or female fittings, with the distinction being that for a male fitting the male body 12 includes an externally threaded portion 16a and the female nut 14 includes an internally threaded portion 16b. For a female fitting, the male nut 12 includes an externally threaded portion 16a and the female body 14 includes an internally threaded portion 16b. The embodiments herein illustrate male fitting embodiments, for example, but the inventions may be conveniently adapted for use with a female fitting assembly and in many cases may not require any adaptation.

The fitting 10 may be used to form a fluid tight connection between a conduit 18 and the body 12 using two or more conduit gripping devices, which in the exemplary embodiments herein may be realized in the form of two or more ferrules. However, conduit gripping devices other than those that may be understood in the art as 'ferrules' may also be used with the inventions herein. We therefore use the terms conduit gripping device and ferrule interchangeably with the understanding that the inventions may be used with conduit gripping devices that may not necessarily be referred to as "ferrules" in the art. The conduit end 18 typically bottoms against a radial shoulder 19 (see FIGS. 6A and 6B) that is part of the body 12, as is well known. The body 12 typically includes a tapered camming surface 20 that contacts a front portion 22 of a first or front conduit gripping device or ferrule 24. The front ferrule 24 includes a camming surface 26 at its back end that contacts a front portion 28 of a second or back conduit gripping device or ferrule 30. The camming surface 26 may be frusto-conical as illustrated herein, however, other contours and profiles may be used as needed. The back ferrule 30 includes a driven surface 32 that contacts a drive surface 34 of the nut 14. The back ferrule front portion also may include a radially extending crown 36 but we also describe herein embodiments that do not require use of a crown. The front and back ferrules include generally cylindrical interior walls 37, 39 that are closely received over the outer surface of the conduit 18. The back ferrule may include one or more radial recesses 39a. Although the exemplary embodiments herein illustrate fitting assemblies that use two conduit gripping devices, the inventions will readily find application to fittings that may use more than two conduit gripping devices, or additional parts other than just ferrules or conduit gripping devices, for example, additional seals.

It is important to note that the exemplary geometric shapes, configurations and designs of the fitting coupling components 12, 14, and the conduit gripping devices 24, 30 are a matter of design choice and will depend in great measure on the materials used, and the design and performance criteria expected of the fitting. Many different coupling components and conduit gripping device designs are known in the art and may be designed in the future. The present disclosure and the inventions described herein and illustrated in the context of exemplary embodiments are directed to structure and method of retaining at least two conduit gripping devices together as a discontinuous subassembly or cartridge which can thereafter be joined with one or more fitting components to form a fitting assembly.

The term "complete pull-up" as used herein refers to joining the fitting components together so as to cause the one or more conduit gripping devices to deform, usually but not necessarily plastically deform, to create a fluid tight seal and grip of the fitting assembly 10 on the conduit 18. Both conduit gripping devices may permanently grip the conduit or only one may permanently grip the conduit or neither may permanently grip the conduit after a complete pull-up. A partial pull-up as used herein refers to a less than complete pull-up but with sufficient tightening of the male and female fitting components together so as to cause the conduit gripping devices to deform so as to be radially compressed against and grip the conduit, but not necessarily having created a fluid tight connection or the required conduit grip that is achieved after a complete pull-up. The term "partial pull-up" thus may also be understood to include what is often referred to in the art as pre-swaging wherein a swaging tool is used to deform the ferrules onto the conduit sufficiently so that the ferrules and the nut are retained on the conduit prior to being mated with the second fitting component to form a fitting assembly. A finger tight position (FTP) refers to the fitting components and conduit gripping devices being in axial contact but loosely assembled onto the conduit, the fitting components and the conduit gripping devices being appropriately arranged in contact with each other, but without any significant tightening of the male and female fitting components together, usually typified by the conduit gripping device or devices not undergoing plastic deformation or radial compression. In many fitting designs, particularly fittings that are pulled up by turns, axial contact of the fitting parts in the finger-tight position may be desirable to assure an accurate starting point for the pull-up operation.

We use the term "discontinuous" to describe the conjoined nature of the cartridge or preassembly 25 in the sense that the two or more conduit gripping devices are manufactured as separate and discrete components and remain separate and discrete components, although in accordance with the inventions herein these parts are retained together as a discrete cartridge, subassembly or preassembly, and further wherein after assembly or even a complete pull-up the parts remain discrete and may be disassembled into their constituent discrete parts if so desired. Thus the terms "discontinuous" or "conjoined" are used herein to distinguish from fitting designs in which two conduit gripping devices are attached to or made integral with each other and may in some designs break off or detach from each other during complete or partial pull-up. In a discontinuous type structure then, as used in this disclosure, the two or more conduit gripping devices release, disengage or otherwise become separable from each other during either partial or complete pull-up without requiring a fracture, shear or other separation of material. In some of the cartridge or subassembly embodiments herein, however, an adhesive may be used as part of the retaining structure. Despite the initial assembly as a cartridge, the conduit gripping devices individually perform as designed and the retaining structure does not interfere with operation and performance of the conduit gripping devices during pull-up. The terms "discontinuous" or "conjoined" are further intended to include broadly the idea that the two or more conduit gripping devices may be loosely or alternatively snugly retained together as a discrete subassembly. The term "connect" and variations thereof as used herein with respect to the discontinuous cartridge 25 means that the conduit gripping devices are initially formed or manufactured as separate, discrete and distinct parts, and then held together in a discontinuous manner as a cartridge or subassembly so as to be able to be easily joined with fitting components (for example, a nut and body) to form a fitting assembly 10, but further that the conduit gripping devices will otherwise retain their expected form, fit and function without interference from the retaining structure R.

FIG. 1A illustrates the fitting 10 in a finger-tight position, meaning that the various parts 12, 14, 24 and 30 have been assembled in axial contact with each other onto the conduit 18 but at most are loosely assembled or slightly tightened or snugged up a bit by joining the nut 14 and body 12 together.

In order to effect complete conduit grip and seal, the nut and body are tightened together—commonly known in the art as pull-up or pulling up the fitting and derivative phrases—such that the back ferrule 30 and front ferrule 24 axially advance against their respective camming surfaces 26 and 20. This causes a radially inward compression of the ferrules against the outer surface of the conduit 18 to effect conduit grip and seal. An outer conical surface 24a of the front ferrule 24 contacts the body camming surface 20, while a contact surface 30a of the back ferrule contacts the camming surface 26 of the front ferrule 24. Although in a finger-tight position the contact surface 30a may form a line contact with the camming surface 26, those skilled in the art will readily appreciate that during pull-up a larger surface area of the front part of the back ferrule may and usually will also contact the camming surface 26; therefore, contact surface 30a includes any portion of the forward portion of the back ferrule that may come into contact with the camming surface 26 during assembly and pull-up. The contact surface 30a may be frusto-conical, tapered or have other profiles and contours as needed. In the exemplary fitting assemblies herein, conduit grip is primarily achieved with the back ferrule, with the front ferrule primarily providing a fluid tight seal. However, in some designs the front ferrule may also grip the conduit and the back ferrule may also provide a fluid tight seal. Thus, the term "conduit gripping device" may include two distinct functions, namely conduit grip and seal, whether or not a specific conduit gripping device performs one or both of those functions. The present inventions may alternatively be used with fittings that use more than two conduit gripping and sealing devices.

Although not limiting the scope of the present inventions, the exemplary fitting designs herein are well known and commercially available from Swagelok Company, Solon, Ohio, except as follows. In these embodiments, the ferrules include a ferrule cartridge feature or retaining structure R that allows the ferrules to be held together as a discrete unit.

The parts 12, 14, 24 and 30 illustrated herein, other than with the ferrule cartridge retaining structure R, are also further described in a number of issued and pending patent applications, including U.S. Pat. Nos. 5,882,050 and 6,629,708 which are fully incorporated herein by reference. The fittings herein may operate as described in such patents, but are modified as described herein to provide a discontinuous cartridge, subassembly or preassembly for retaining the conduit gripping devices together in a cartridge-like fashion. It is preferred that the retaining structures for the ferrule cartridge concept do not alter the form, fit and function of the basic fitting design and operation.

As an overview of the inventive concepts disclosed herein, there are a number of characteristics for a discontinuous ferrule cartridge retaining structure that preferably but not necessarily in all cases are desirable. These characteristics may in some applications involve tradeoffs as to which ones may have greater significance in overall fitting performance and use as will be apparent from the following discussion. This list is not intended to be an exhaustive list of all characteristics, and one or more of the ones discussed herein may not be notable or needed for specific applications.

One characteristic we refer to as a reasonably robust connection or RRC. By RRC we mean that the retaining structure is designed such that the connected conduit gripping devices will not easily come apart with normal handling, either individually or bulk, during subassembly, inventory, and subsequent assembly with fitting components to form a fitting assembly. The terms "normal" and "easily" as used herein intentionally indicate that the degree to which the ferrule cartridge does not come apart during use is a matter of design choice. But to better understand those terms, we view "normal" handling as any handling of the ferrule cartridge that can be expected or likely to happen throughout manufacturing, assembly and use of the ferrule cartridge. This may include handling by manufacturing personnel, inventory personnel, shipping personnel and end users. It can be expected that during such normal handling a ferrule cartridge may be exposed to forces that could tend to knock the conduit gripping devices loose or even separate. For example, the ferrule cartridge may be accidentally dropped from several or many feet onto a hard floor or against a hard object or surface at various installations or manufacturing/assembly stages. The designer may determine the level of force that the ferrule cartridge can withstand without damage to the parts or separating or loosening as needed. Normal handling therefore would not include the use of excessive or damaging force to attempt purposely to separate the conduit gripping devices. However, the designer may choose to facilitate the option of being able to separate the parts using proper tools and procedures if so desired. In other words, the designer has the option to determine how easily the ferrule cartridge may be disassembled into its constituent parts. In some applications, the ferrule cartridge might be designed so that it cannot be separated without damaging one or more of the constituent parts, and in other designs the ferrule cartridge may be disassembled with simple manual force, and a wide range of available "ease" in between.

The aspect of ease of separation of the discontinuous cartridge components also raises the terms disengage, release or separation and derivative forms thereof when used in the context of describing the ferrule cartridge. We use these terms interchangeably in two contexts. The first context is the separation or disassembly of the ferrule cartridge into its constituent parts when done prior to installation of the connected ferrules or conduit gripping devices into a fitting. In the other context, we refer to disengagement, separation or release of the ferrules from the retaining structure that will occur during pull-up of the fitting assembly. Now, in this latter context, the fitting is being pulled-up so the ferrules are not literally separated from each other, and in fact are driven together axially so as to deform and grip the conduit. But we refer to a ferrule or ferrules as releasing or disengaging from the retaining structure during pull-up to describe that the retaining structure no longer holds the ferrules together. For example, in the FTP, the ferrules may not be released from the retaining structure, and an installer could easily back the nut off the body and remove the ferrule set cartridge or subassembly. However, at a selectable axial position of the ferrules relative to each other during a pull-up operation, the retaining structure will no longer be functional to hold the ferrules together. Having the ferrules disengage or release from the retaining structure may be used, for example, to avoid rotation of the conduit during pull-up which might occur due to torque transmission from the nut, through the retained ferrules to the conduit. Reference to a ferrule or ferrules releasing or disengaging from the retaining structure is intended to convey the idea that the ferrules as a subassembly are no longer held together by the retaining structure. In the illustrated embodiments herein, only one of the ferrules is directly disengaged from the retaining structure, for example, the back ferrule releasing from the extension 40. But in the sense that the two ferrules no longer are held together by the retaining structure, one may consider that the "ferrules" have disengaged because the retaining structure no longer functions to hold the ferrules together. Therefore, whether we refer to one ferrule or two ferrules being disengaged or no longer held by the retaining structure, the concept is that the retaining structure no longer holds the two ferrules together.

Another characteristic of the discontinuous ferrule cartridge concept relates to maintaining a sufficient bore diameter (SBD). By SBD we mean that the retaining structure does not cause shrinkage or compression of the interior bore diameter of any of the conduit gripping devices that would adversely encroach on the bore tolerance to allow a conduit to be inserted through the bore. A related characteristic we refer to as axial bore alignment (ABA) by which we mean that the retaining structure does not cause an axial misalignment of the conduit gripping devices that would adversely encroach on the effective through bore tolerance for inserting a conduit through both devices. ABA may refer to axial alignment of the conduit gripping device bores with respect to each other or maintaining an axial through bore for each conduit gripping device (in other words, not adversely bending or deflecting a conduit gripping device so as to deform a portion of its bore off-axis).

Another characteristic of the discontinuous ferrule cartridge concept is preferably to maintain proper finger tight contact (FTC) when the cartridge is assembled into a fitting to a finger-tight position. Fittings are commonly assembled first to a finger tight position (FTP) by which the various parts are assembled onto a conduit in a fairly loose manner and then tightened without enough force to deform the conduit gripping devices but with sufficient force to assure FTC. For example, in the exemplary case of FIGS. 1A and 1B, FTC means that there is axial contact between the front portion 22 of the front ferrule or conduit gripping device 24 with the tapered camming surface 20 of the body 12; axial contact between the front portion 28 of the back ferrule or conduit gripping device 30 and the camming surface 26 of the front ferrule 24; and axial contact between the drive surface 34 of the nut fitting component 14, and the driven surface 32 of the back ferrule or conduit gripping device 30. It is usually desirable, although not necessarily required in all cases, that these axial contacts are present in the FTP. An assembler can usually feel or sense this complete axial contact by noticing a distinctive resistance to further manual tightening of the fitting components 12, 14 together.

Another characteristic of the retaining structure for a discontinuous ferrule cartridge is preferably to have the retaining structure not adversely interfere with the functional separation of the conduit gripping devices or the form, fit and function of the conduit gripping devices during pull-up, thereby permitting each conduit gripping device to interact with the body and nut and each other to effect conduit grip and seal. We refer to this characteristic as maintaining two ferrule function (TFF), it being understood that none of these characteristics are limited by the term "ferrule" and not limited to only use of two conduit gripping devices.

Next we will discuss three types of discontinuous ferrule cartridge connection embodiments that are directed to the above noted characteristics. It will be readily apparent that some of these embodiments achieve one or more of the characteristics, perhaps to varying degrees, thus providing a designer with a number of choices. But alternative embodiments will be available that do not necessarily achieve any of the above characteristics or to lesser degree, yet still being within the scope of the claimed inventions. The types are not necessarily presented in any preferred order. We then will describe exemplary embodiments of each type. Although the descriptions reference ferrules, the inventions may be used with other conduit gripping devices other than just those known or referred to as ferrules.

The first type (Type 1), we refer to as a radial compression connection. In one embodiment, a retaining structure is provided that may be realized in one example in the form of a flexible portion of the front ferrule that protrudes axially from the back end of the front ferrule. This flexible portion may be integrally formed with the front ferrule or attached thereto. A forward portion of the back ferrule may be press fit into the flexible portion of the front ferrule to hold the two ferrules together as a ferrule cartridge or subassembly. The protrusion is preferably flexible enough to allow the back ferrule to be inserted a sufficient distance to provide a reasonably robust connection, but without radially compressing the back ferrule beyond an acceptable SBD. In press fit configurations of the prior art, the press fit operation could radially compress the rear device so as to adversely affect the through bore, or at least there is no control over the amount of radial compression other than to use special fixturing and control during assembly. Use of a flexible portion allows the designer to strike a balance between having an adequately robust connection without adversely affecting the SBD, allowing easier assembly of the parts. This is because the flexible portion may be used so that ferrule deformation during the press fit operation is taken up by the flexible member and not the body of the front or back ferrule. In this manner, the flexible portion does not interfere with the basic geometry or operation of either ferrule.

By having the flexible portion extend axially back from the main body of the front ferrule, upon pull-up the retaining structure will not interfere or adversely affect the operation of either ferrule as to each other, the conduit or the fitting components. Moreover, unlike the prior art, the retaining structure, in a Type 1 arrangement, used for the press fit does not need to participate in the form, fit or function of the front ferrule as that ferrule relates to the overall fitting. In other words, the front ferrule may operate the same way whether the extension is present or not. In the prior art designs, the front device and in particular the retaining structure remains in contact with the back device and is not separated from the operation of the devices during pull-up.

Thus, in a Type 1 design (and all the embodiments herein), the first and second conduit gripping devices or ferrules disengage from the retaining structure at a selectable position during pull-up. In order that the retaining structure not interfere or adversely affect the form, fit and function of the ferrules, it is preferred although not necessary that the retaining structure allow the ferrules to disengage or release from the retaining structure after just a slight axial advance of the back ferrule relative to the front ferrule, for example, after about 0.01 inch to about 0.015 inch of movement of the back ferrule relative to the front ferrule. These are only intended to be exemplary values, it being understood that the preference is that the retaining structure no longer hold the ferrules together after some pre-determinable displacement of the ferrules relative to each other. However, the axial position of the back ferrule relative to the front ferrule at which the ferrules become disengaged may be selected by the designer as needed for a particular application.

The second type (Type 2), we refer to as a controlled axial position connection. In one embodiment, a retaining structure provides a hook-like member on the front ferrule that moves over a portion of the back ferrule during assembly of the ferrule cartridge. This movement positions the hook-like member in such as manner as to significantly reduce radial load on the back ferrule, but also to axially press the back ferrule contact surface against the front ferrule camming surface. By assuring this axial contact, a robust connection is made with little or no effect on SBD, and at the same time providing FTC as between the ferrules even before the ferrule cartridge is installed into a fitting. This also eliminates axial dead space at the ferrule contact area, which dead space otherwise would take up some of the pull-up stroke (for example, when pull-up is carried out based on number of turns). This assures that there is no dead space between the ferrules which may be desirable in some fitting designs. In a Type 2 approach, rather than using the hook-like member, the ferrules may alternatively be joined with an adhesive as part of the retaining structure in such a manner as to assure no dead space between the ferrules and to further assure metal to metal contact where the contact surface of the back ferrule contacts the camming surface of the front ferrule, both for FTP and throughout pull-up. The alternative use of an adhesive also releases the ferrules during pull-up and by being positioned out of the contact area between the ferrules, does not adversely affect the operation of the ferrules during pull-up. As with Type 1, the Type 2 concept allows the ferrules to individually perform as designed to achieve the TFF characteristic if so desired.

The third type (Type 3) we refer to as a loose ferrule connection. In one embodiment, a retaining structure holds the ferrule together but without any significant radial or axial load between the ferrules. This looser assembly allows some degree of freedom of movement of the ferrules with respect to each other. For example, the ferrules can pivot somewhat with respect to each other and the retaining structure, and also rotate with respect to each other. The ferrules can also rotate with respect to each other about the axis X, thus eliminating any tendency of the connection to induce twist or torque into the conduit during pull-up before the ferrules release from the retaining structure. The Type 3 approach may be used to best achieve all five of the above-mentioned characteristics (RRC, SBD, ABA, FTC and TFF), albeit without controlled axial position because of the intentionally looser connection. As with the Type 1 and Type 2 concepts, the Type 3 concept allows the ferrules to individually perform as designed to achieve the TFF characteristic if so desired.

With reference again to FIGS. 1A and 1B, we illustrate an embodiment of a Type 2 design. Generally, a retaining structure R is provided for interlocking or connecting the conduit gripping devices 24, 30 together as a single unit, cartridge or subassembly 25 prior to installation of the conduit gripping devices onto the conduit 18. The retaining structure R typically will include a first portion that is associated with one of the conduit gripping members and a second portion that is associated with the other conduit gripping member. In various embodiments, the retaining structure may involve cooperating structural features added to both conduit gripping devices (or alternatively using an additional part) as compared to what might be the design of those conduit gripping devices in a non-cartridge design. In such cases we refer to the retaining structure having two portions. But in other embodiments, the retaining structure may be a structural feature associated with one of the conduit gripping devices that utilizes a structural feature of the other conduit gripping device even if that other device has not been modified to allow for a cartridge design. Therefore, as used herein, the concept of a retaining structure R does not necessarily require that the retaining structure be identified as two distinct parts. As an example, in FIGS. 1A and 1B, the retaining structure R is realized with the extension 40. This retaining structure cooperates with the back ferrule, but the back ferrule has not been modified so as to work with the retaining structure, the back ferrule design is a commercially available design.

In alternative embodiments, the retaining structure may be a separate part or element that attaches the conduit gripping devices together, but the exemplary embodiments herein illustrate retaining structures that are part of and formed integral with one or alternatively both of the conduit gripping devices. An example of a separate part or element for the retaining structure is a snap fastener wire located in a pocket (42 in FIG. 2A) of the front ferrule, through which the crown 36 of the back ferrule may be snapped into position. As noted above, the term "connecting" and variations thereof as used herein with respect to the subassembly 25 means that the conduit gripping devices are initially formed or manufactured as separate and distinct parts, and then joined together in an interlocking or secured manner so as to be able to be easily installed as a single piece unit into a fitting. This is distinguished from some prior art arrangements in which two conduit gripping devices are integrally formed together such as machining both devices from a single piece of material or attaching a conduit gripping device to another by welding, for example.

As contrasted with conventional or known front ferrule designs, the front ferrule 24 in this embodiment may include an annular rearward flexible extension 40 that functions as the retaining structure R. This extension 40 may take on any shape or configuration that is compatible with the front portion 28 of the back ferrule 30, so that the extension 40 functions to hold the ferrules together. As shown in FIGS. 1A, 1B and 2A, the extension 40 is generally annular and extends axially from a back wall 41 of the front ferrule 24. For example, the extension 40 may act as a clip or tang that snaps over the crown 36 of the back ferrule 30 when the ferrules are axially pressed together. To this end, the extension 40 may be provided with a degree of flexure or radial give so that it can radially expand sufficiently to allow the front portion of the back ferrule to snap into the back end of the front ferrule, but will also relax back to a lower energy state in a position to hold the ferrules together with a robust connection to the degree of robustness needed for a particular use. Preferably, although not required, the extension 40 accommodates the back ferrule 30 and holds it so that the ferrules cannot be easily disassembled after they are connected together as a single unit. However, the degree or amount of force needed to separate the subassembly may be selected based on the particular application. In some cases it may be desirable to make it difficult to separate the ferrules after they have been joined together. For example, it may be desired in some cases to require a tool to separate the subassembly. But in other situations, it may be desirable to allow for easier separation. Therefore, as used herein, the subassembly 25 includes connected together ferrules to the extent that the ferrules are held together so that the ferrules do not simply or easily fall apart under normal stress or handling.

The flexibility of the extension 40 may be controlled, for example, by controlling the geometry of the extension, particularly the radial thickness of the extension body 40a and its hinge or pivot connection region 40b. Typically, the extension body 40a will be substantially thinner than the engaging portion (such as the crown 36) of the back ferrule 30 so that the press fit stress is taken up primarily by flexing of the extension 40 outward to allow the crown 36 to be received in the pocket 42 (FIG. 2A). The extension 40 may in some cases then be viewed as a thin web of metal compared to the bulk metal body of the back ferrule 30. Having a hinge region 40b of short axial length may also be used to control the flexibility of the extension 40. This would again be in contrast to a conventional press fit of a body being forced into a bore of a generally rigid continuous body.

The extension 40 need not be circumferentially a single piece. For example, the extension 40 may comprise several axially extending fingers, such as three or more for example evenly positioned about the axis X, that snap over the crown. Although a snap fit may be useful in many applications because of the tactile and audible feedback, such may not always be needed and is considered an optional feature of this embodiment.

As the embodiment of FIGS. 1A and 1B may be a Type 2 version, it is preferred that the extension 40 hold the ferrules 24, 30 together in an axially compressed manner so as to maintain contact between the contact surface 30a of the back ferrule and the camming surface 26 of the front ferrule. For the specific geometry shown, this contact will be generally in the form of a line contact between the two surfaces, but a line contact is not necessarily required. By having this axial contact between the two ferrules when connected as a cartridge 25, the subassembly helps to maintain axial alignment of the interior walls 37, 39 to the finger tight position and also to help assure axial contact or the FTC characteristic during assembly with the nut 14 and the body 12.

FIGS. 2A and 2B illustrate the front ferrule and the back ferrule in greater detail. In this example, the extension 40 provides a groove or pocket 42 into which the front portion 28, and particularly the crown 36, of the back ferrule is received. The extension 40 preferably includes a lip 44 that is pushed past the crown 36 and acts to prevent the back ferrule 30 from falling out of the pocket 42. This is achieved because the inside diameter of the lip 44 may be preferably somewhat smaller than the maximum outer radial dimension of the retained portion of the back ferrule, in this example the crown 36. The shape of the pocket 42 may take any form to accommodate the front portion of the back ferrule that is to be snapped into the pocket (for back ferrules having different shapes and geometries). The lip 44 provides a radially inward reverse contour surface 45 that engages a radially inward reverse contour surface 47 of the crown 36, so that the lip 44 may be used to apply an axial bias or load L (noted by the arrow in FIG. 2B) against the back ferrule inward surface 47, which load will force or hold the contact surface 30*a* against the camming surface 26 of the front ferrule. We use the term "reverse contour" as a convenience to clarify that the axial component of the direction of the surface contour is generally opposite the direction of ferrule axial movement during pull-up. Typically the contour may be realized as a frusto-conical surface, however, other profiles or contours may be used as needed. The back ferrule radially inward reverse contour surface 47 thus cooperates with the retaining structure R. The flexibility of the extension 40 may be chosen so as to exert the desired force between the contact surface 30*a* and the camming surface 26, as well as the desired degree of robustness to the connected ferrules Although a snap type fit may be desirable in many cases, such is not required. In some cases it may be sufficient to have a snug or tight interference fit between the back portion of the front ferrule and the front portion of the back ferrule. Because the front portion of the back ferrule is radially compressed inward against the conduit during pull-up, the extension 40 will not interfere with normal operation and performance of the fitting 10.

The flexible extension 40 facilitates a connection that can be alternatively described as a high energy interference fit or press fit position that transitions to a low energy retaining position, analogous in some respects to a detent arrangement. When the separate ferrules are initially pushed axially together (as indicated with the arrow M), the larger radius crown 36 will tend to spread the extension 40 radially outward so that the lip 44 can slide over the crown. The interference in diameters between the crown 36 and the lip 44 results in the use of a determinable amount of force or higher energy to push the crown 36 past the lip 44 and into the pocket 42. When the crown 36 clears the lip 44, the lip 44, and more generally the extension 40, can then return to its lower energy position in which it is not radially pushed out. Because the lip 44 is now behind and in contact with the inward surface 47 of the crown, the lip 44 will hold the ferrules together in axial compression against each other. The size and radial dimension of the pocket 42 may be selected to apply a desired hoop load against the crown 36 in the low energy position if so desired. But it is contemplated that in the low energy state, there will not be a significant radial load against the front portion of the back ferrule so as to maintain SBD. This is in distinct contrast to a conventional press fit arrangement in which the back ferrule would otherwise be radially compressed and possibly adversely affected as to SBD. The flexible extension 40 allows for a brief radial load on the back ferrule during assembly of the cartridge as the back ferrule snaps into the front ferrule. It will further be noted, that because the extension 40 may be used to achieve a controlled axial position of the ferrules with respect to each other because the extension provides for axial contact between the two ferrules. Again, in a conventional press fit assembly, fixturing would be needed if it is to be assured that there is proper axial contact as the back ferrule is pushed through the radial press fit interference, particularly made more difficult in controlling SBD.

Figure 3:
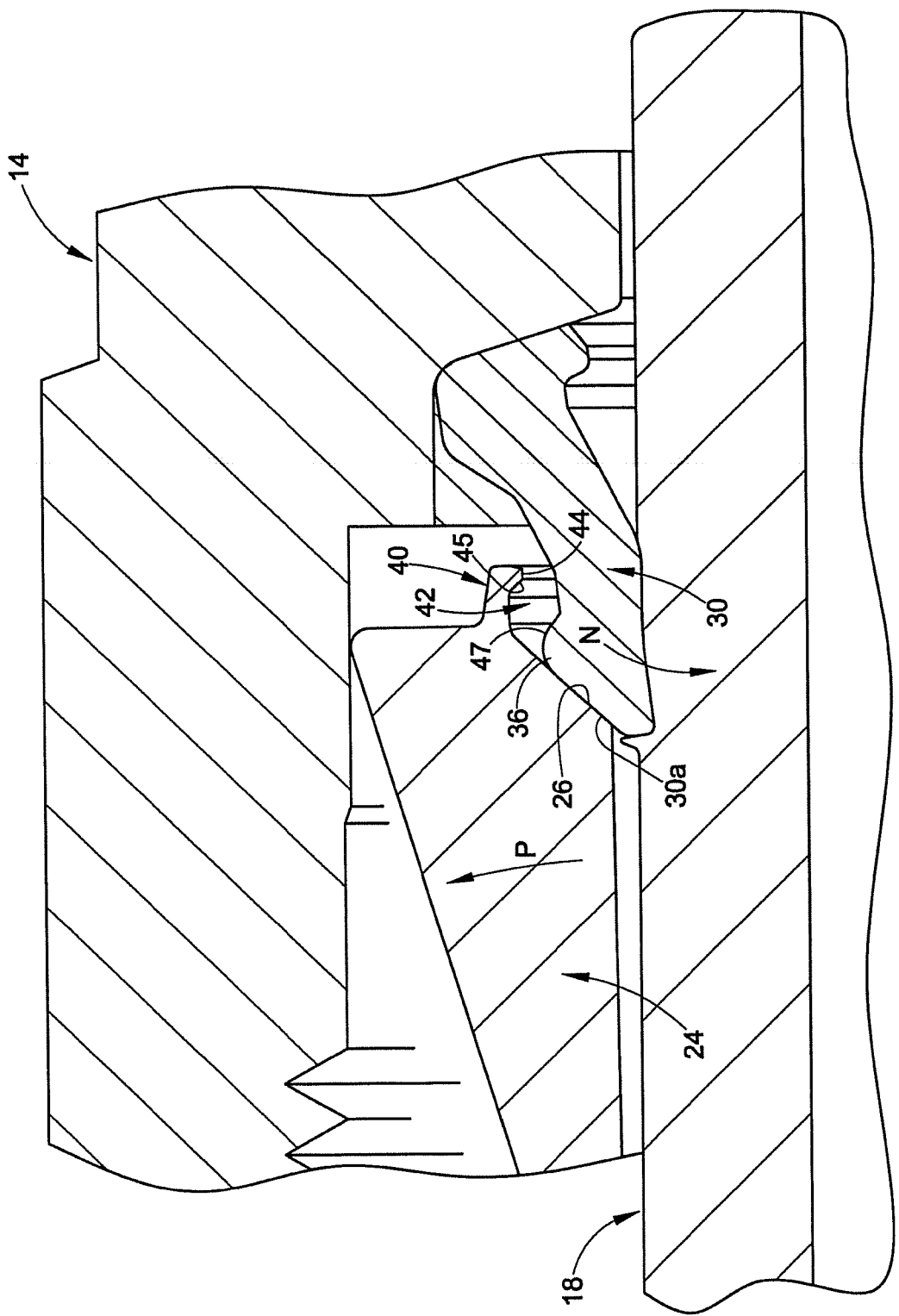
FIG. 3 illustrates the embodiment of FIG. 1 in a pulled up or tightened condition.

The fitting 10 of FIGS. 1A and 1B is illustrated in a pulled-up position in FIG. 3. Note that a radial inward compression (depicted with the arrow N) of the crown 36 occurs as a result of the sliding contact between the contact surface 30*a* of the back ferrule and camming surface 26 of the front ferrule. This movement produces a reduction in the outer diameter of the crown 36 so that the crown 36 no longer will engage the extension 40. This assures that the extension 40 does not in any manner affect the pull-up and operation of the ferrules as the nut and body are tightened together. The ferrules move, grip and seal in the same manner, for example, as described in the above referenced patents. Note also that during pull-up the back ferrule 30 tends to radially expand the back end of the front ferrule, as depicted with the arrow P. This movement may also be used to assure that during pull-up the ferrules disengage from the retaining structure or extension 40. During pull-up, the ferrules 24, 30 are axially driven together to form the desired conduit grip and seal of the fitting assembly 10 on the conduit 18. The axial position at which the crown 36 no longer engages the extension 40 will depend on various geometry considerations such as the diameter of the lip 44 and the diameter of the crown 36, as well as the various angles of contact which will determine how quickly the front portion of the back ferrule is radially driven inward relative to axial displacement. The designer may choose to design the retaining structure R so as to have the disengagement occur at a desirable axial position during pull-up. For example, the designer may prefer that the ferrules disengage or release from the retaining structure even after a partial pull-up, or almost immediately when the ferrules first start to be axially moved towards one another. In any case, the preferred technique is that the retaining structure R not interfere with the normal pull-up operation of either ferrule or the nut and body fitting components.

Although the retaining structure R in this example conveniently makes use of the crown 36 for holding the ferrules together, other back ferrule geometries may be alternatively used, and in particular back ferrules that include some other structure or protrusion that may be used to capture or retain the back ferrule with the front ferrule using an appropriate retaining structure. Even though the crown is a circumferential feature of the back ferrule, in such alternative embodiments the structure or protrusion need not be completely circumferential.

While the embodiment of FIGS. 1A and 1B illustrate an extension 40 that may be integrally formed so as to provide the high energy to low energy transition and optionally the snap-fit connection, alternatively the extension 40 may be formed initially with a diameter sufficient to easily receive the crown of the back ferrule in the pocket 42, and then the extension 40 may undergo a further processing step, such as rolling, peening or swaging to name some examples, in order to radially compress the extension 40 to a position that it holds the back ferrule 30.

Figure 4:
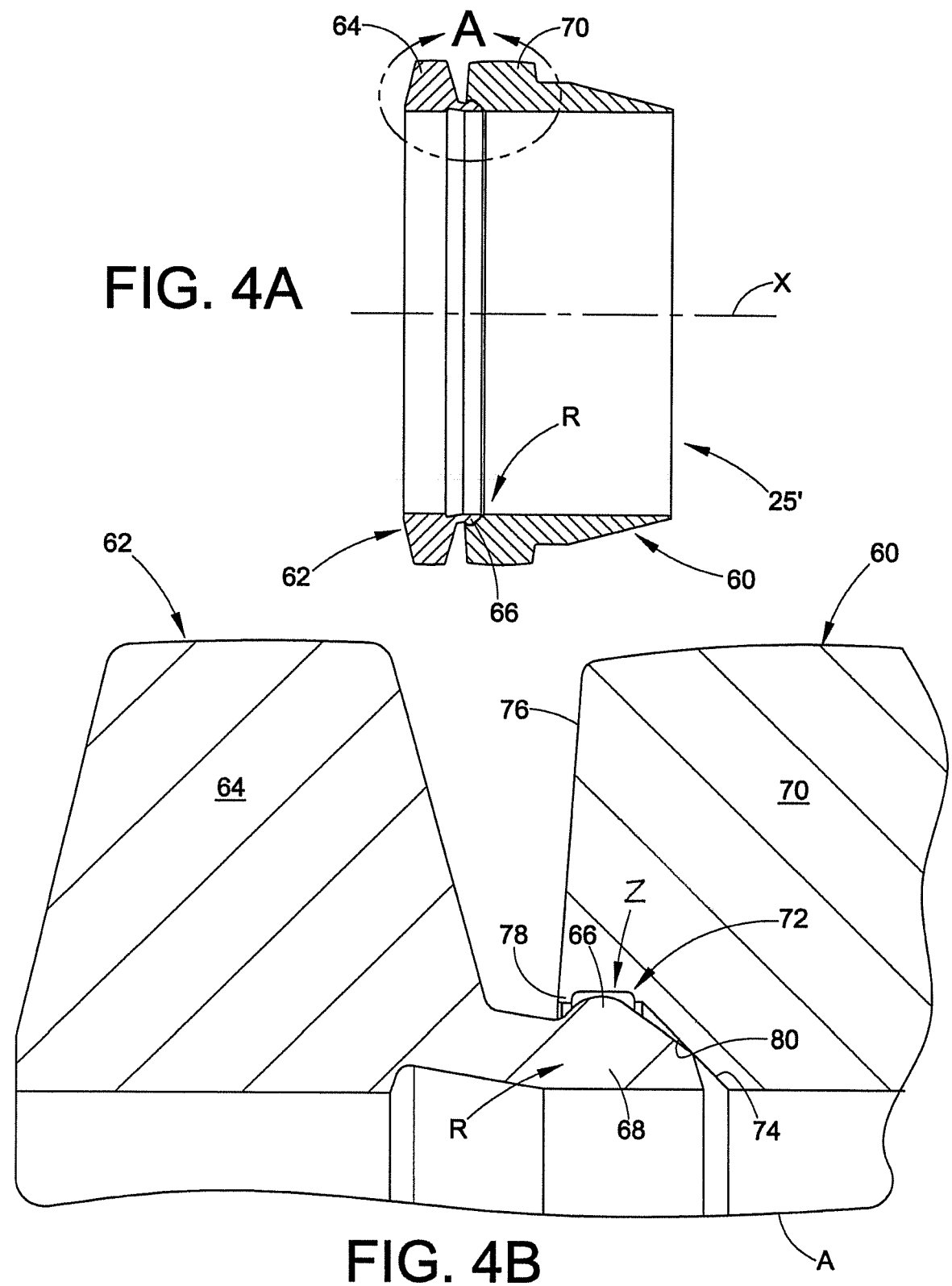
FIGS. 4A and 4B illustrate another embodiment of a ferrule cartridge arrangement, showing the ferrules in half longitudinal cross-section and in an assembled condition.

FIGS. 4A and 4B illustrate another embodiment, showing an enlarged view of the connection between the front ferrule 60 and the back ferrule 62 in an assembled condition to form a single unit, cartridge or subassembly 25' prior to installation with a conduit and the nut and body. In this embodiment, the back ferrule 62 has a substantially larger back flange portion 64 compared to the back ferrule of the FIG. 1A embodiment, so that the crown 66 is axially rather close to the back flange portion 64. Therefore, there is not as much front portion 68 to fit into a pocket formed by an axial extension of the front flange such as the embodiment of FIG. 1A. In this case then, the back end 70 of the front ferrule 60 has a pocket or recess 72 formed therein, for example with a counterbore, axially between the camming surface 74 and the back wall 76 of the front ferrule. The pocket 72 is defined in part by a radially inward lip 78 that snaps or otherwise slides past or over the crown 66 when the ferrules are pressed together. The inside diameter of the lip 78 is smaller than the outermost diameter of the crown 66, so that after the ferrules are assembled together they remain together because the lip 78 prevents the back ferrule, and in particular the crown 66, from easily backing out of the pocket 72. In this embodiment, the lip 78 does not necessarily have much radial "give" or expansion, so that in order to push the ferrules together the forward portion of the back ferrule will momentarily be radially compressed or flexed inward to allow the crown 66 to be positioned in the pocket 72. This action of momentarily compressing the back ferrule does not adversely affect SBD because the assembly quickly goes to a low energy state with little or no radial load needed against the back ferrule. As in the embodiment of FIG. 1A, the lip 78 and pocket 72 may be dimensioned and shaped so as to provide a snap or click when the parts are properly assembled together as a single unit or subassembly. Also, the lip 78 will not interfere with normal operation and performance of the fitting during and after pull-up.

The cartridge 25' in this example may be a Type 2 connection in that the lip 78 axially holds the back ferrule contact surface 80 against the front ferrule camming surface 74 for controlled axial position. Alternatively, the dimensions of the pocket 72 may be enlarged somewhat so that the crown 66 and front portion 68 of the back ferrule 62 is more loosely retained in the pocket 72. This would be a version of a Type 3 connection. Whether used as a Type 2 or Type 3 connection, the designer may specify the appropriate dimensions for the retaining structure to provide a desired robustness to the connection.

As still a further alternative embodiment, in place of the lip 78, an adhesive may be used to attach the back ferrule front portion 68 to the front ferrule. The general location for application of the adhesive is indicated in FIG. 4B. In such an alternative embodiment, it is preferred to apply the adhesive in an area that will allow direct metal to metal contact between the contact surface 80 of the back ferrule and the camming surface 74 of the front ferrule. This direct contact therefore will avoid dead space that could otherwise be presented by the adhesive should the adhesive either be on the camming surface or flow onto the camming surface. An example of a location (as indicated by the directional arrow Z) for the adhesive would be at the top of the crown 66 to fill in the space between the top of the crown and the front ferrule surface of the pocket. In such a case, the adhesive along with the ferrule surfaces that are joined together comprise the retaining structure R. Upon pull-up, the adhesive will shear and the ferrules will be disengaged and function as two separate ferrules. In still a further alternative embodiment, the back ferrule front portion geometry may allow an adhesive to hold the ferrules together with direct metal to metal contact without having to provide the recessed pocket 72 in the front ferrule.

Figure 5:
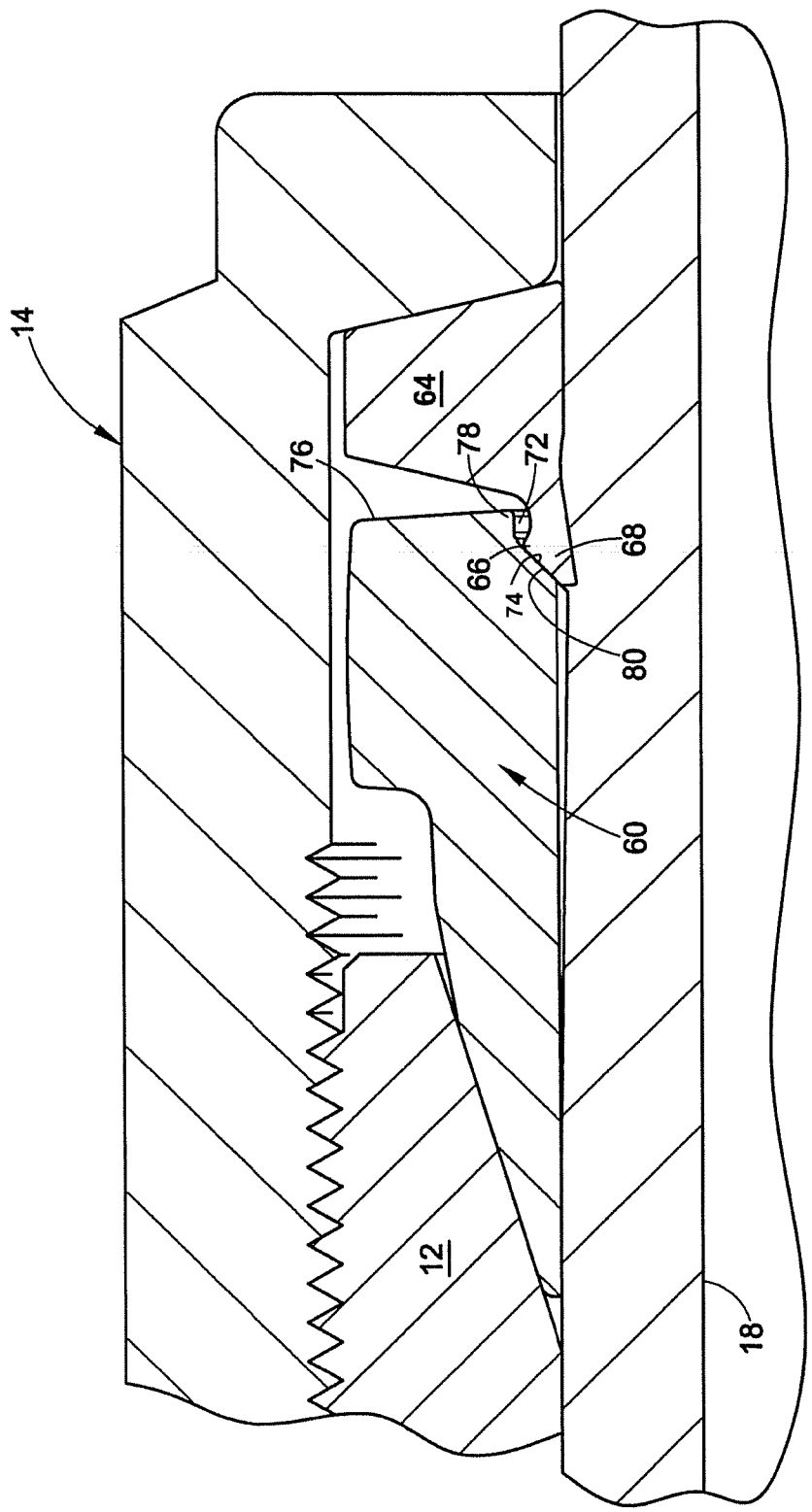
FIG. 5 illustrates the embodiment of FIGS. 4A and 4B in a fitting in a pulled-up position.

FIG. 5 illustrates a fitting that includes the ferrule cartridge 25' in the pulled-up position. As with the embodiment of FIGS. 1A and 1B, upon pull-up the front portion 68 of the back ferrule is compressed radially inwardly to release the crown 66 from any interference or engagement with the lip 78 and pocket 72. The front ferrule 60 may also rotate radially outward to further separate the crown 68 from the retaining structure R.

Figure 6A:
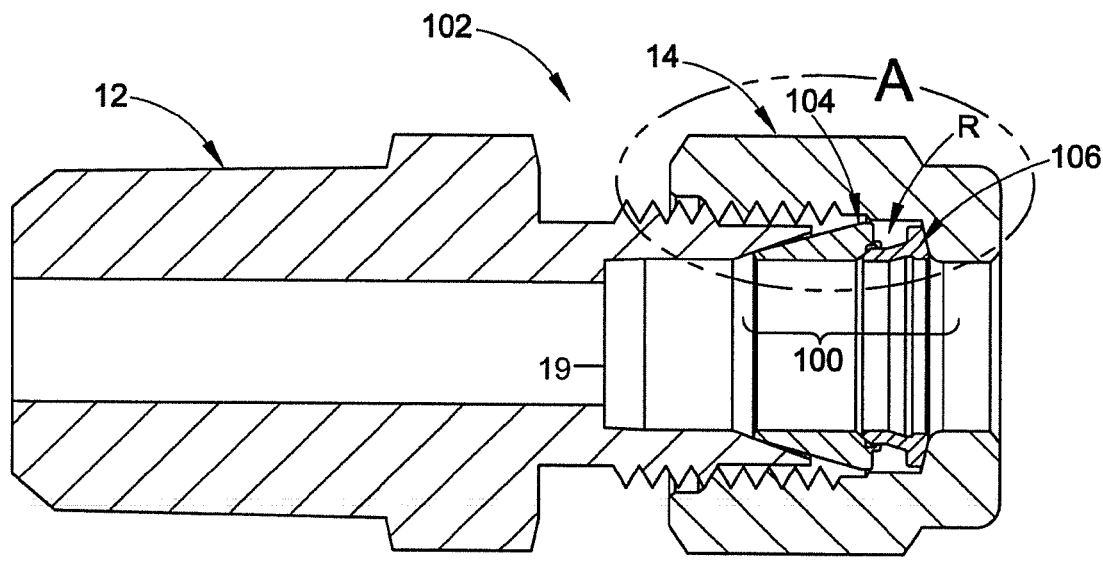
FIGS. 6A and 6B illustrate another embodiment of a ferrule cartridge in a finger tight position.
Figure 6B:
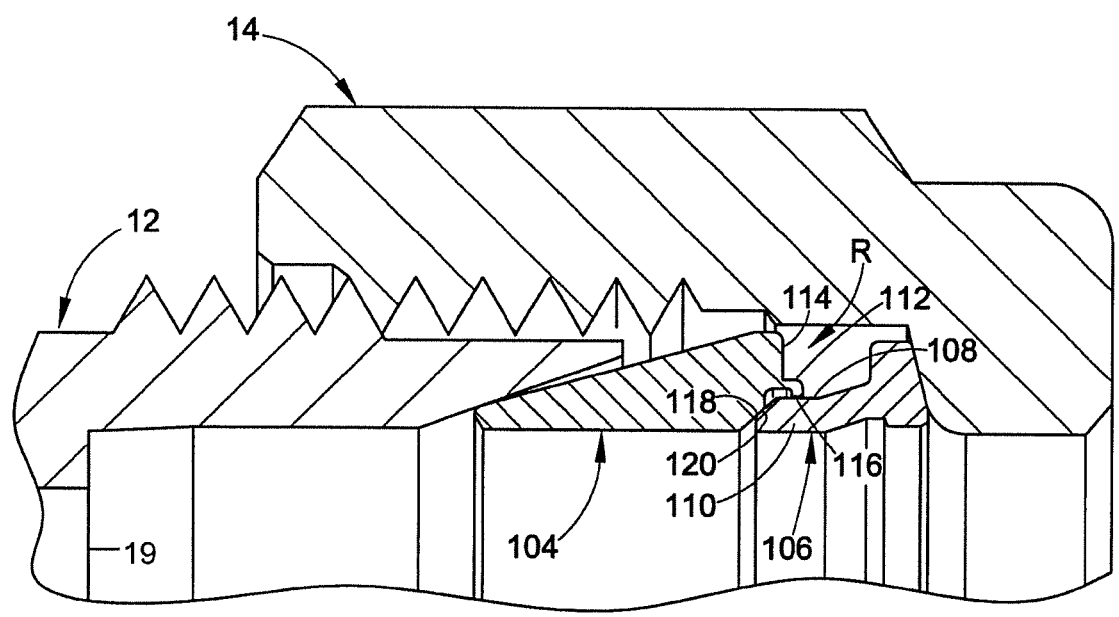

With reference to FIGS. 6A and 6B we illustrate another embodiment of a ferrule cartridge connection. As noted, the back ferrule 30, 62 in the above embodiments included the crown 36, 66, but many back ferrule designs do not use such a crown or other radial outward protrusion. In many cases, the back ferrule includes a cylindrical or tapered outer wall. In such cases, an extension may be used to retain the ferrules together.

In the embodiment of FIGS. 6A and 6B then, a discontinuous ferrule cartridge 100 is shown used with a fitting assembly 102 having a nut 14 and body 12 fitting components. A retaining structure R may be provided to connect the front ferrule 104 with the back ferrule 106. The fitting 102 may operate in a similar manner to the description of the fitting 10 hereinabove. In this case, however, the back ferrule 106 does not have a crown, but rather a cylindrical or tapered outer wall 108 as part of the front portion 110 of the back ferrule. In such a case, the retaining structure R may be realized in the form of an axially directed flexible extension 112 from a back wall 114 of the front ferrule. The extension 112 may be flexible in the same sense as described hereinabove, and may also include an engagement surface 116 (FIG. 7) that can frictionally contact the outer wall surface 108 of the back ferrule to retain the ferrules together. The engagement surface 116 may be cylindrical or have another profile to facilitate the grip against the outer wall of the back ferrule 106. In some cases, the engagement surface 116 may be treated such as by roughening to increase the frictional contact. As in the embodiment of FIGS. 1A and 1B, upon pull-up as in FIG. 7, the retaining structure R releases the ferrules, such as by due to the radial inward compression of the front portion 110 of the back ferrule, and/or the radial outward movement of the back portion of the front ferrule. This allows for the TFF characteristic, in particular that the ferrules may operate as a two ferrule system in combination with the nut and body. Although the embodiment of FIGS. 6B does not give a controlled axial position, other than at initial assembly of the cartridge 100, the use of the flexible extension 112 allows for the back ferrule to be fully inserted into the front ferrule such that the contact surface 118 of the back ferrule contacts the camming surface 120 of the front ferrule. This embodiment is a radial compression Type 1 connection and therefore may be used to achieve RRC and SBD, and also ABA and FTC at initial assembly of the cartridge 100.

Figure 7:
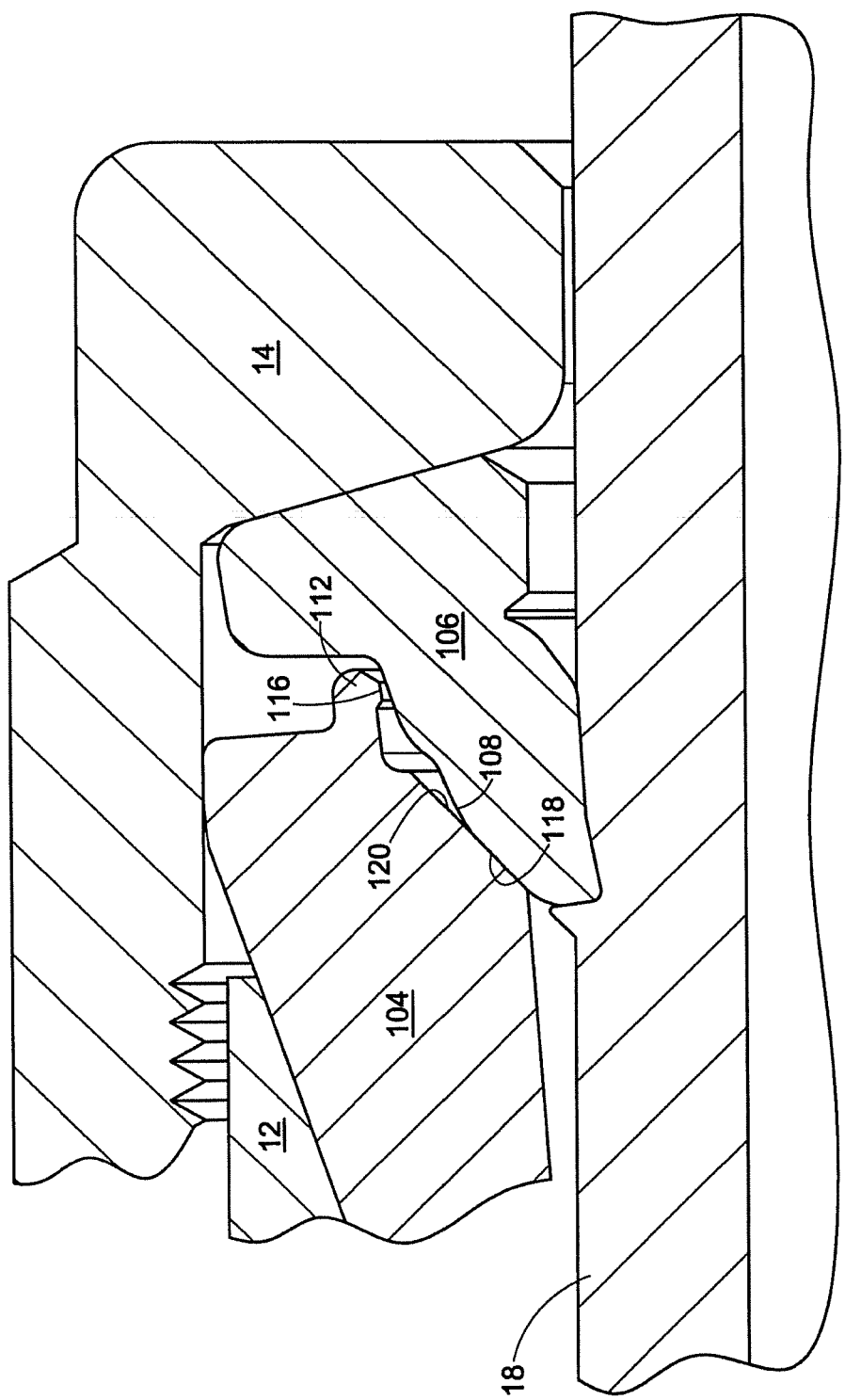
FIG. 7 illustrates the embodiment of FIG. 6A in a pulled-up position.
Figure 8A:
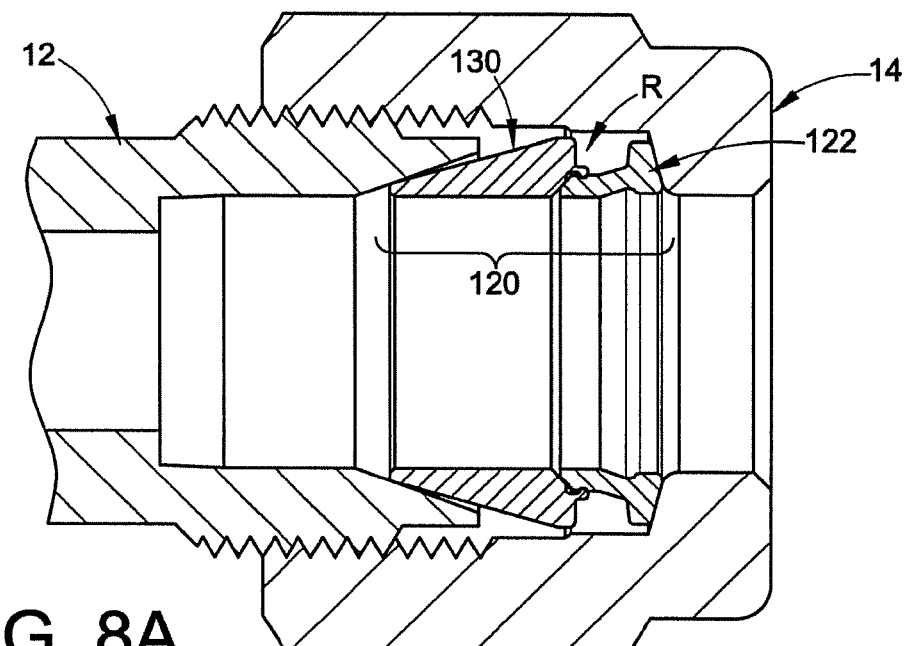
FIGS. 8A and 8B illustrate another embodiment of a ferrule cartridge in a finger tight position.
Figure 8B:
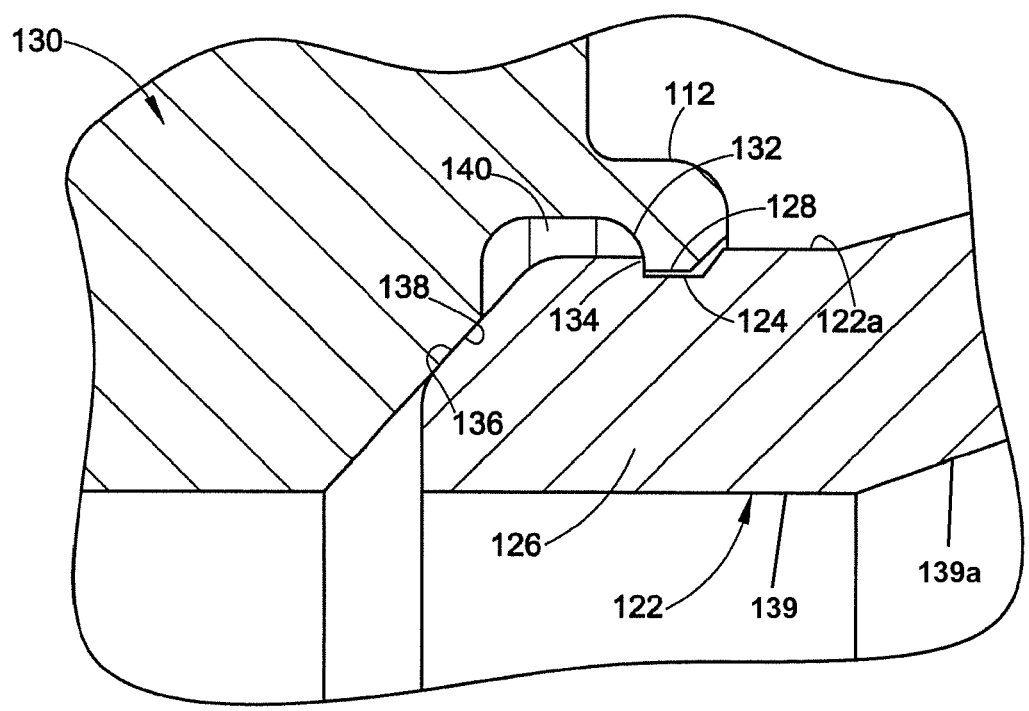
Figure 9:
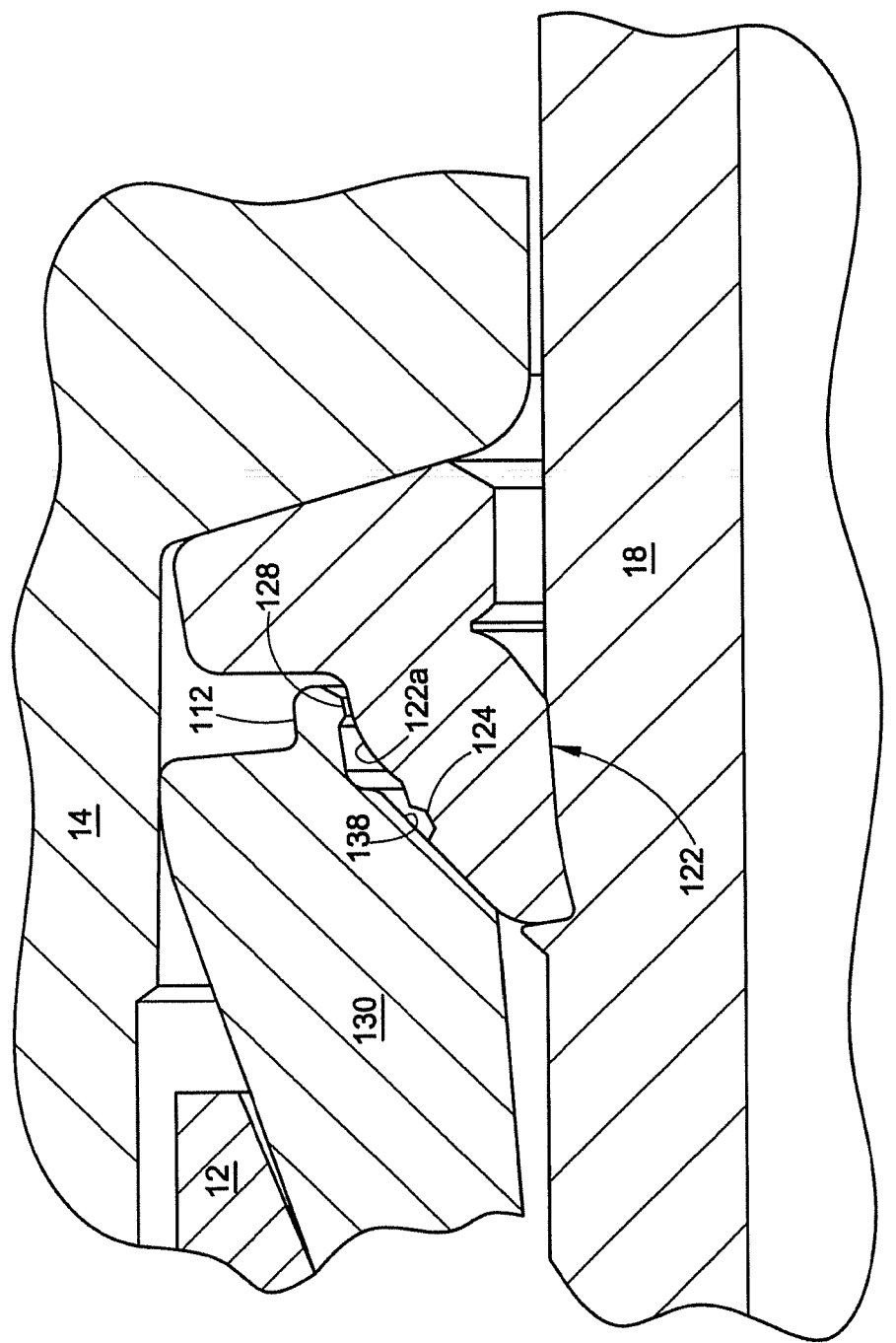
FIG. 9 illustrates the embodiment of FIG. 8A in a pulled-up position.

A Type 2 embodiment of FIGS. 8A, 8B and 9 is similar to the embodiment of FIGS. 6A and 6B and 7, and a detailed repetition is not needed with like numerals referencing like parts or features. The two embodiments differ structurally in that the ferrule cartridge 120 may include a back ferrule 122 in which a circumferential notch or recess 124 is formed in a front portion 126 of the back ferrule, axially aligned with the cylindrical inner wall 139 of the back ferrule, with an inner radial recess 139a extending rearward of the cylindrical inner wall 139, as shown in FIG. 8B. This recess 124 may be formed in the outer wall 122a of the back ferrule, which outer wall may be cylindrical, tapered or have another profile as needed. This recess 124 receives a radially inward projection 128 of the flexible extension 112 of the front ferrule 130. The radially inward projection 128 may present a reverse contour surface 132 that engages a surface or corner 134 of the recess 124 so as to apply an axial bias to the back ferrule that applies an axial load for the contact surface 136 of the back ferrule against the camming surface 138 of the front ferrule. This embodiment therefore may be used to provide a controlled axial position type connection if so desired. Alternatively, the recess 124 and the radially inward projection 128 may be sized so as to allow the ferrules 130, 122 to be loosely held together to provide a Type 3 connection. Note that a relief notch or recess 140 may be provided as needed to accommodate the radial dimension and shape of the back ferrule when the ferrules are connected together as the discontinuous ferrule cartridge 120. FIG. 9 illustrates the embodiment of FIG. 8A in a pulled-up position, and as with the other embodiments described hereinabove, the retaining structure R releases from the ferrules during pull-up and does not interfere with the ferrules and fitting components during pull-up.

Figure 10:
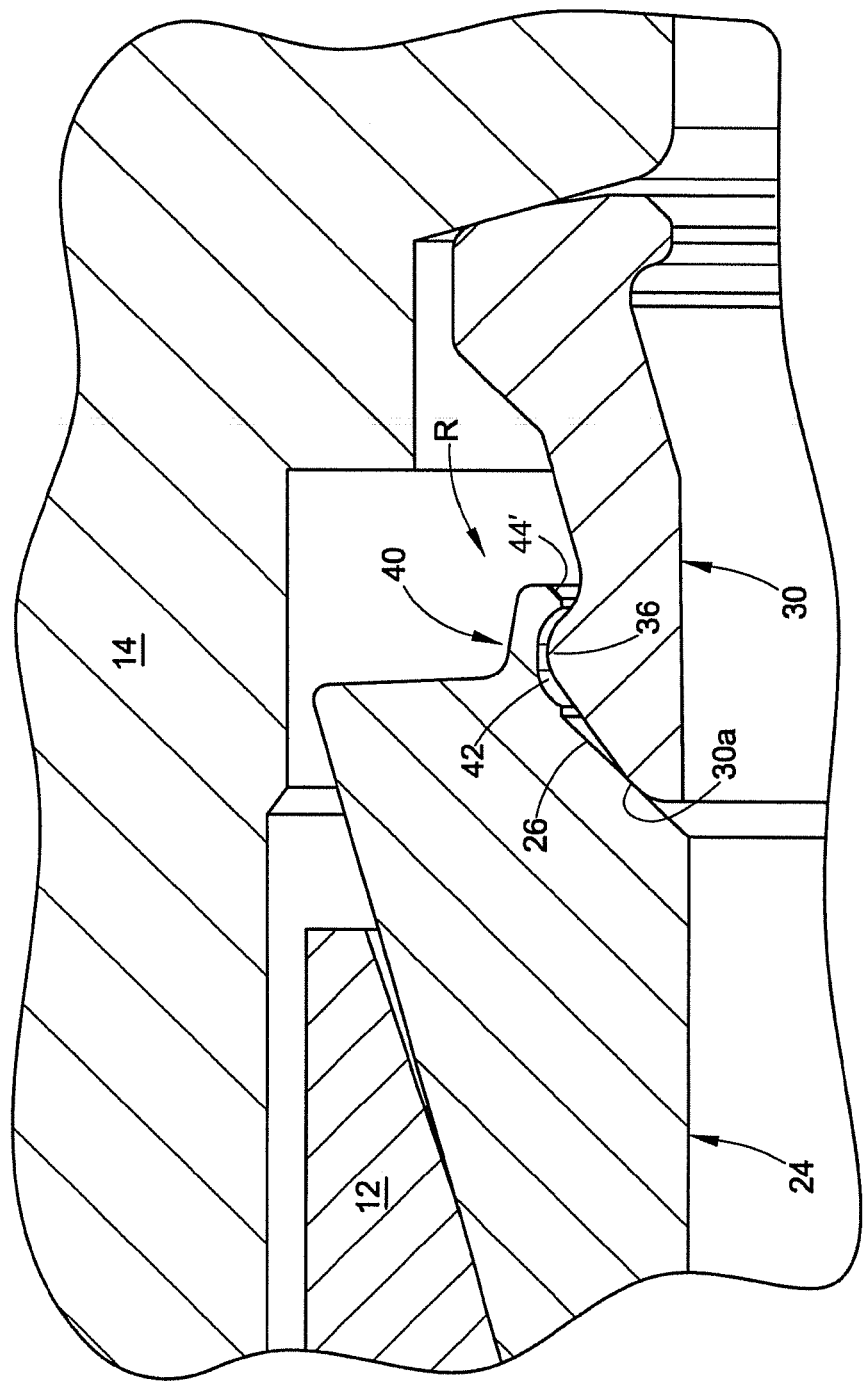
FIG. 10 illustrates another embodiment of a ferrule cartridge in a finger tight position.

With reference to FIG. 10, we illustrate another embodiment of a Type 3 connection, that is a modification of the embodiment of FIGS. 1A and 1B hereinabove. Again, like parts and features are given the same reference numerals. In this embodiment, the pocket 42 may be enlarged so as to more loosely retain the crown 36, which will allow for a looser but still reasonably robust connection between the two ferrules. The flexible extension 40 may also extend radially inward to a greater extent from the back wall 41 of the front ferrule as compared to the FIG. 1B version to increase robustness if so needed. The flexible extension 40 may also include a radial protrusion 44' to provide a more robust and assured retention of the ferrules together in light of the looser fit.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A subassembly for a conduit fitting, comprising:
a first conduit gripping device and a second conduit gripping device, said first conduit gripping device comprising a camming surface at a back portion thereof, said second conduit gripping device comprising a contact surface at a forward portion thereof that contacts said camming surface,
a retaining structure comprising a first portion that is part of said first conduit gripping device and a second portion that is part of said second conduit gripping device, said first portion having an inside diameter that is smaller than an outside diameter of said second portion, so that said retaining structure holds said first conduit gripping device and said second conduit gripping device together as a discrete subassembly;
wherein said first conduit gripping device and said second conduit gripping device each provide conduit grip and a conduit fluid-tight seal when radially compressed against an outer surface of a conduit;
wherein said first conduit gripping device and said second conduit gripping device disengage from each other during pull-up.

2. The subassembly of claim 1 wherein said retaining structure holds said first conduit gripping device and said second conduit gripping device together as a discontinuous cartridge.

3. The subassembly of claim 1 wherein said first portion of said retaining structure comprises a flexible retaining member that snaps over a forward portion of said second conduit gripping device when said first and second gripping devices are axially pressed together.

4. The subassembly of claim 3 wherein said first portion of said retaining member initially engages said forward portion of said second conduit gripping device with a first energy compressive position and holds said forward portion in a second energy position, said second energy being lower than said first energy.

5. The subassembly of claim 1 wherein said first portion of said retaining structure snaps over said second portion when said first conduit gripping device and said second conduit gripping device are axially forced together into a retained position.

6. The subassembly of claim 1 wherein said first conduit gripping device and said second conduit gripping device comprise all metal material.

7. The subassembly of claim 1 wherein said first conduit gripping device and said second conduit gripping device can rotate relative to each other when loosely held together by said retaining structure.

8. The subassembly of claim 1 wherein, when said first conduit gripping device and said second conduit gripping device are axially moved together during pull-up, said second conduit gripping device will plastically deform and permanently grip the conduit.

9. The subassembly of claim 1 wherein said first conduit gripping device and said second conduit gripping device disengage by plastic deformation of one or both of said first conduit gripping device and said second conduit gripping device.

10. The subassembly of claim 1 wherein said contact surface is frusto-conical, and said second portion of the retaining structure comprises a crown that is defined in part by said frusto-conical contact surface.

11. The subassembly of claim 1 wherein said retaining structure first portion is received in a recess formed in said forward portion of said second conduit gripping device.

12. The subassembly of claim 1 wherein said retaining structure first portion provides a pocket or recess that receives said retaining structure second portion.

13. The subassembly of claim 1 wherein said retaining structure first portion comprises a flexible extension that extends from a back wall of said first conduit gripping device.

14. The subassembly of claim 1 wherein said first conduit gripping device and said second conduit gripping device each provide conduit grip and a conduit fluid-tight seal after pull-up.

15. A subassembly for a conduit fitting, comprising:
a first conduit gripping device and a second conduit gripping device, said first conduit gripping device comprising a camming surface at a back portion thereof, said second conduit gripping device comprising a contact surface at a forward portion thereof that contacts said camming surface,
a retaining structure comprising a first portion that is part of said first conduit gripping device and a second portion that is part of said second conduit gripping device, said first portion having an inside diameter that is smaller than an outside diameter of said second portion, so that said retaining structure holds said first conduit gripping device and said second conduit gripping device together as a discrete subassembly;
wherein said first conduit gripping device and said second conduit gripping device each provide conduit grip and a conduit fluid-tight seal when radially compressed against an outer surface of a conduit
wherein said retaining structure holds said first conduit gripping device and said second conduit gripping device together as a discrete subassembly prior to installation of said first conduit gripping device and said second conduit gripping device into a fitting.

16. The subassembly of claim 15 wherein said first conduit gripping device and said second conduit gripping device disengage from each other during pull-up.

17. A conduit fitting comprising:
a first conduit gripping device and a second conduit gripping device, said first conduit gripping device comprising a camming surface at a back portion thereof, said second conduit gripping device comprising a contact surface at a front portion thereof that contacts said camming surface,
a retaining structure comprising a first portion that is part of said first conduit gripping device and a second portion that is part of said second conduit gripping device, said first portion having an inside diameter that is smaller than an outside diameter of said second conduit gripping device so that said retaining structure holds said first conduit gripping device and said second conduit gripping device together as a subassembly; and
a first fitting component and a second fitting component that can be joined to said first fitting component with said subassembly disposed between said first fitting component and said second fitting component, wherein said first conduit gripping device and said second conduit gripping device will disengage during pull-up of the first fitting component with the second fitting component, so that said retaining structure no longer holds said first conduit gripping device and said second conduit gripping device together.

18. The conduit fitting of claim 17 wherein said second conduit gripping device disengages from said first conduit gripping device during pull-up as a result of said second conduit gripping device being radially compressed and plastically deformed.

19. The conduit fitting of claim 17 wherein said first fitting component comprises a body and said second fitting component comprises a nut.

20. The conduit fitting of claim 17 wherein said first fitting component comprises a male threaded body and said second fitting component comprises a female threaded nut.

21. The conduit fitting of claim 17, wherein said second conduit gripping device will permanently grip a conduit after pull-up of the first fitting component with the second fitting component.

22. The conduit fitting of claim 17, wherein said second conduit gripping device provides a conduit fluid-tight seal when said first conduit gripping device and said second conduit gripping device are axially moved together during pull-up of the first fitting component with the second fitting component.

* * * * *